(12) United States Patent
McDermott

(10) Patent No.: US 8,979,320 B1
(45) Date of Patent: Mar. 17, 2015

(54) LED LIGHTING DEVICE

(71) Applicant: Kevin McDermott, Rockledge, FL (US)

(72) Inventor: Kevin McDermott, Rockledge, FL (US)

(73) Assignee: Kevin McDermott, Rockledge, FL (US)

( * ) Notice: Subject to any disclaimer, the term of this patent is extended or adjusted under 35 U.S.C. 154(b) by 0 days.

(21) Appl. No.: 14/061,038

(22) Filed: Oct. 23, 2013

(51) Int. Cl.
*F21V 3/00* (2006.01)
*F21V 13/04* (2006.01)
*F21K 99/00* (2010.01)
*F21V 5/04* (2006.01)

(52) U.S. Cl.
CPC . *F21V 13/04* (2013.01); *F21K 9/50* (2013.01); *F21V 5/046* (2013.01)
USPC .......................................................... 362/299

(58) Field of Classification Search
None
See application file for complete search history.

(56) References Cited

U.S. PATENT DOCUMENTS

| | | | | |
|---|---|---|---|---|
| 6,582,103 | B1 * | 6/2003 | Popovich et al. | 362/307 |
| 6,598,998 | B2 * | 7/2003 | West et al. | 362/307 |
| 6,679,621 | B2 * | 1/2004 | West et al. | 362/327 |
| 7,168,827 | B2 * | 1/2007 | Stein et al. | 362/299 |
| 7,254,309 | B1 * | 8/2007 | Chou et al. | 385/146 |
| 8,118,457 | B2 * | 2/2012 | Kanai | 362/327 |
| 2005/0286251 | A1 * | 12/2005 | Smith | 362/327 |
| 2008/0144323 | A1 * | 6/2008 | Chang | 362/310 |
| 2008/0151551 | A1 * | 6/2008 | Yang et al. | 362/308 |
| 2009/0129097 | A1 * | 5/2009 | Ewert et al. | 362/328 |
| 2012/0155092 | A1 * | 6/2012 | Hsueh et al. | 362/309 |
| 2014/0063816 | A1 * | 3/2014 | Seki et al. | 362/309 |

* cited by examiner

*Primary Examiner* — Britt D Hanley
(74) *Attorney, Agent, or Firm* — Lowe Hauptman & Ham, LLP

(57) ABSTRACT

A lighting device includes a light emitting diode (LED) element configured to emit light about an axis. The lighting device further includes an optic of a transparent material. The optic includes a first surface configured to intersect and refract said emitted light to form a first light interior to the optic, a second surface configured to intersect and reflect said first light to form a second light interior to the optic. The optic further includes a third surface configured to intersect and reflect said second light to form a third light interior to the optic. The optic further includes a fourth surface configured to intersect and transmit said third light to form a fourth light exterior to said optic. The fourth surface is further configured to concentrate the fourth light about an emerging light plane perpendicular to said axis.

20 Claims, 3 Drawing Sheets

LED LIGHTING DEVICE

BACKGROUND

Light emitting diode (LED) light sources (LED lamps) are more efficient, more compact and have operating lives which far exceed incandescent lamps. Due to improvements in LED technology, many new lighting devices incorporate LED light sources in place of incandescent lamps. Although LED light sources have many advantages over incandescent lamps, there are differences which must be reflected in the design of LED lighting devices. For example, incandescent lamps are relatively immune to overheating, whereas LED light sources are easily damaged by overheating. In addition, incandescent light sources emit light of substantially equal intensity throughout a surrounding sphere whereas LED lamps emit light of a varying intensity within a hemisphere. Incandescent lamps typically have a light emitting tungsten wire at a distance from a base or socket which naturally places the light source at a distance from a printed circuit board (PCB). In contrast, LED lamps have an LED element in close proximity to the PCB due to the placement of connecting terminals. The PCB is typically protected within a housing of the lighting device holding many electronic components including the LED light source. The location of the LED light source within the housing in combination with a pattern of light emerging from the LED creates problems if the objective of the lighting device is to emit light perpendicular to an axis of the light emerging from the LED light source. Potential problems include unacceptable amounts of emitted light being intercepted by the housing thereby reducing the intensity of the light emerging from the lighting device, the LED overheating, an optical device design being large, the design including a separate PCB making it more complex and an unacceptable reduction in efficiency.

SUMMARY

A light emitting diode (LED) lighting device including an LED lamp emitting a light about an axis. An optic configured to intersect and redirect a first portion of the emitted light to concentrate the light about the axis and subsequently to redirect the light away from the axis toward a plane perpendicular to the axis. The optic having a first surface refracting the first portion of the emitted light and a second surface reflecting the light from the first surface for increasing the concentration of the light about the axis. The optic having a third surface reflecting the light from the second surface for directing the light away from the axis and toward a plane perpendicular to the axis. The optic having a fourth surface intersecting the light from the third surface and transmitting the light to an exterior of the optic. The optic having a fifth surface refracting a second portion of the emitted light and directing it toward the third surface. The third surface additionally reflecting the light from the fifth surface and directing the light toward a horizontal plane.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion. One or more embodiments are illustrated in the accompanying drawings, incorporated by reference herein in their entirety, in which.

DETAILED DESCRIPTION

Figure 1:
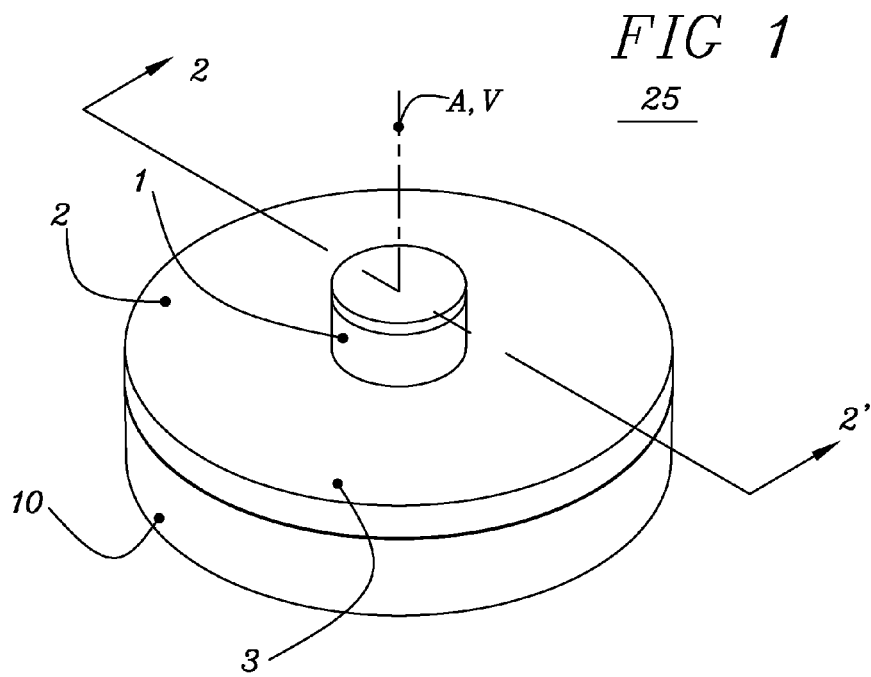
FIG. 1 is a perspective view of a light emitting diode (LED) lighting device in accordance with some embodiments.
Figure 2:
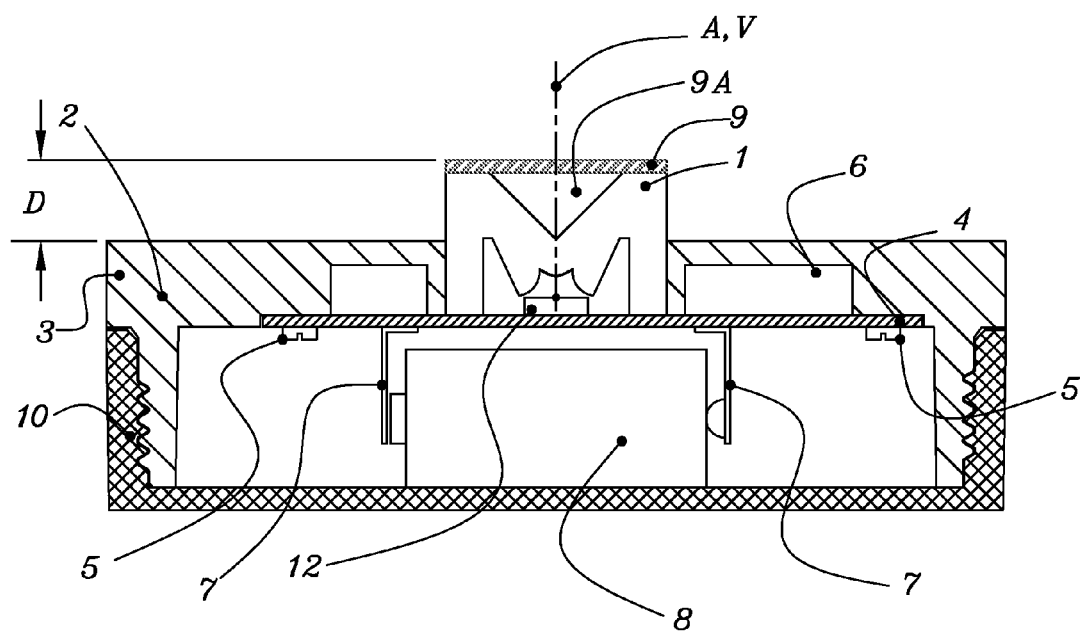
FIG. 2 is a cross-sectional view of an LED light device accordance with some embodiments.

FIG. 1 is a perspective view of a light emitting diode (LED) lighting device 25 in accordance with some embodiments. LED lighting device 25 includes optic 1 on top 2 of housing 3. FIG. 2 is a cross-sectional view of an LED light device in accordance with some embodiments. FIG. 2 is a view taken along line 2-2' of FIG. 1. FIG. 2 includes an LED 12 soldered to printed circuit board (PCB) 4. LED 12 is a high intensity surface mount ceramic LED; however, other LEDs are also within the scope of this description. FIG. 2 also includes optic 1 glued to PCB 4 and top 2 to form a fixed relationship between optic 1 and LED 12. PCB 4 is attached to top 2 with screws 5. Top 2 is configured to leave space 6 above PCB 4 to accommodate electronic components (not shown) away from battery 8 to reduce the possibility of damage from battery fluids or gasses.

Electronic components are typically used to control the power delivered to LED 12. PCB 4 further includes contacts 7 to support battery 8 which is used to energize LED 12. Optic 1 includes cover 9 to prevent liquid, dirt or debris from interfering with a reflecting Surface S3 (FIG. 4) of optic 1. Cover 9 is sonic welded or glued to optic 1 forming a hermetically sealed compartment 9A. In some embodiments, cover 9 is a transparent plastic for those lighting devices which have some light emerging about an axis A. In some embodiments, cover 9 is an opaque plastic for those lighting devices which have minimum visibility from above. Optic 1 with cover 9 installed extends a distance D1 above top 2. Top 2 is threaded into base 10 to form housing 3. Top 2 and optic 1 are shown as separate components glued together; however, in some embodiments top 2 and optic 1 are combinable into a single transparent molded component formed during a single molding operation.

Figure 3:
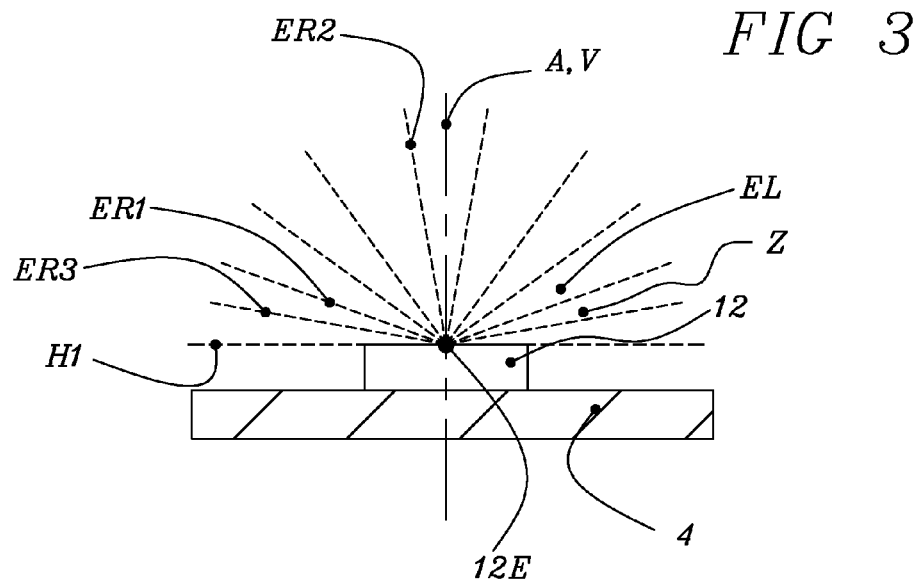
FIG. 3 is a cross-sectional view of an LED in accordance with some embodiments.

FIG. 3 is a cross-sectional view of LED 12 in accordance with some embodiments. Energized LED 12 emits emitted light EL throughout a hemisphere about axis A which is coincident with a vertical V. LED 12 includes LED element 12E which is a point source of the light emitted coincident with horizontal plane H1. Emitted light EL is distributed throughout a hemisphere about axis A with a maximum intensity along axis A and the intensity decreasing as light rays diverge from axis A. Emitted light ray ER3 at an 80° divergence from axis A represents a substantially decreased intensity versus the intensity along axis A. Light rays diverging from axis A in excess of 80° represent a minimal energy. Emitted light ray ER1 which diverges from axis A by approximately 70° represents a reasonable amount of energy as does the light in zone Z between emitted light rays ER3 and ER1. The diagrams of FIGS. 3 and 4 are two-dimensional diagrams based upon a cross-sectional view taken along 2-2' of FIG. 1; however, the functioning of optic 1 as described herein applies throughout the hemisphere above plane H1 and about axis A as alternate sections of FIG. 1 rotated about axis A would be similar.

Figure 4:
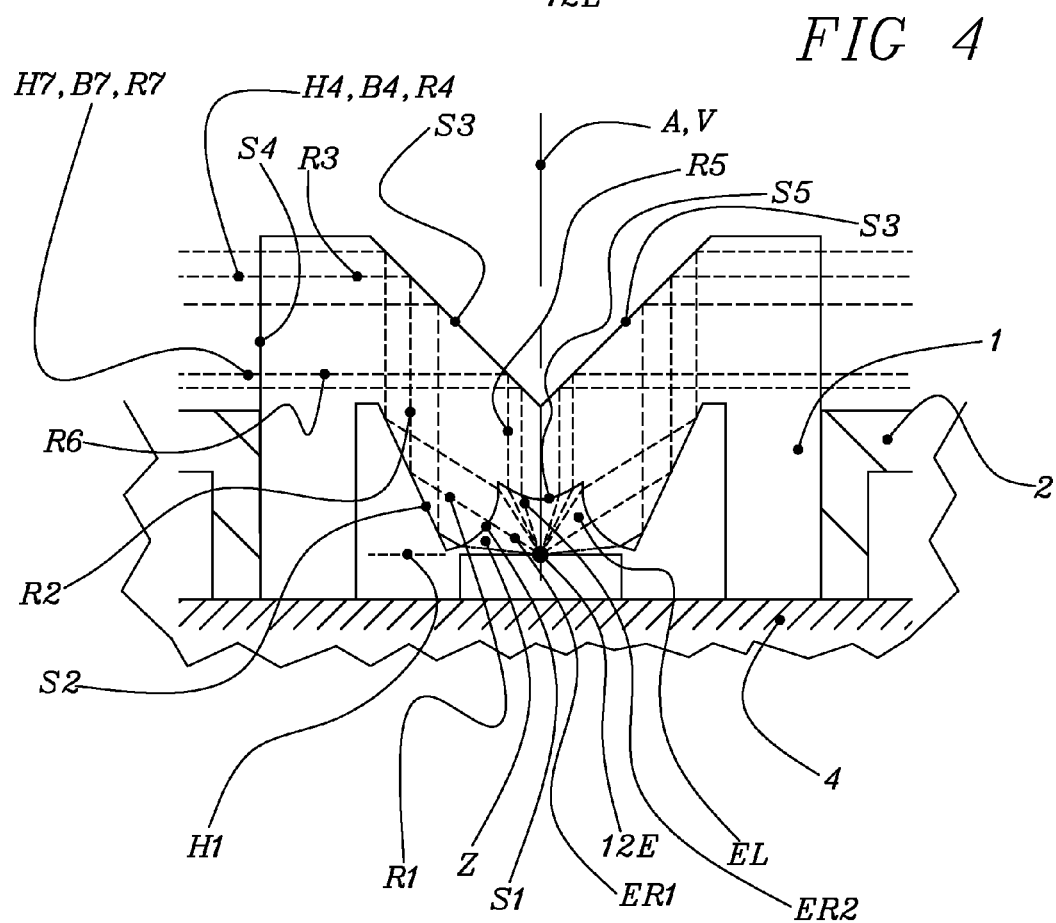
FIG. 4 is an enlarged view of an optic in accordance with some embodiments.

FIG. 4 is an enlarged view of an optic in accordance with some embodiments. A contour of optic 1 is a two-dimensional diagram; however, in some embodiments optic 1 is a surface of revolution about axis A such that the optic collects and redirects substantially all of the light emerging from LED 12. Looking at FIG. 4, emitted light EL emerging from LED element 12E includes emitted light ray 1 which intersects surface S1 to be refracted within optic 1. Other light rays of emitted light EL refracted by curved surface S1 are similarly concentrated within optic 1 and combined to form an interior light directed toward surface S2. Surface S2 is configured to intersect and reflect light ray R1 to create light ray R2 directed toward surface S3. Other interior light rays similar to light ray R2 directed by surface S2 combine to form an interior light directed toward surface 3. Surface S3 is configured to intersect and reflect light ray R2 to create light ray R3 directed toward surface S. Other interior light rays similar to light ray R3 directed by surface 3 are combined to form an interior light directed toward surface S4. Surface S4 is configured to intersect and transmit interior light ray R3 to create light ray R4. Light ray R4 is exterior to optic 1 and parallel to horizontal plane H4. Light ray R4 is typical of the large quantity of exterior light rays of emitted light EL which were intersected and redirected by optic 1 to emerge from optic 1 as intense exterior light beam B4 concentrated about horizontal plane H4 and distributed throughout 360° within horizontal plane H4. In some embodiments, light beam B4 is directed along horizontal plane H4 and has a beam width of plus or minus 5 degrees. One of ordinary skill in the art would recognize that one or more surfaces of optic 1 are able to be adjusted to change a beam width or direction of emerging light beam B4.

FIG. 4 additionally indicates emitted light ray ER2 has a divergence of approximately 10 degrees from axis A which intersects surface S5 of optic 1 to be refracted within optic 1 to form internal light ray R5 directed toward surface S3. Other emitted light rays of emitted light EL intersected and refracted by curved surface S5 would be similarly concentrated within optic 1 and similarly directed toward surface S3. Surface S3 is configured to intersect and reflect interior light ray R5 to create interior light ray R6 directed toward surface S4. Surface S4 is configured to intersect and transmit interior light ray R6 to create exterior light ray R7. Light ray R7 is exterior to optic 1 and parallel to horizontal plane H7. Light ray R7 is typical of a large quantity of light rays of emitted light EL which are intersected by optic 1 and redirected by optic 1 to emerge from optic 1 as intense Light beam B7 concentrated about horizontal plane H7 and distributed throughout 360 degrees of horizontal plane H7. In some embodiments, light beam B7 is directed along horizontal plane H7 and has a beam width of plus or minus 5 degrees. One of ordinary skill in the art would recognize that one or more surfaces of optic 1 are adjustable to change the beam width or direction of emerging light beam B7.

Therefore, optic 1 intersects a first group of light rays of emitted light EL typified by emerging light ray ER1 for concentrating the light, directing the light toward axis A and then directing the light away from axis A toward horizontal plane H4 to form light beam B4. This first group of light rays represents a first portion of emitted light EL. Optic 1 additionally intersects a second group of light rays of emitted light EL typified by emitted light ray ER2 first concentrating the light toward axis A and subsequently directing the light away from axis A toward horizontal plane H7 to form light beam B7. This second group of light rays represents a second portion of emitted light EL. Light beams B4 and B7 are directed along different horizontals; however, because each has a beam width, light beams B4 and B7 will overlap and appear to an observer as a single intense beam of light.

Figure 5:
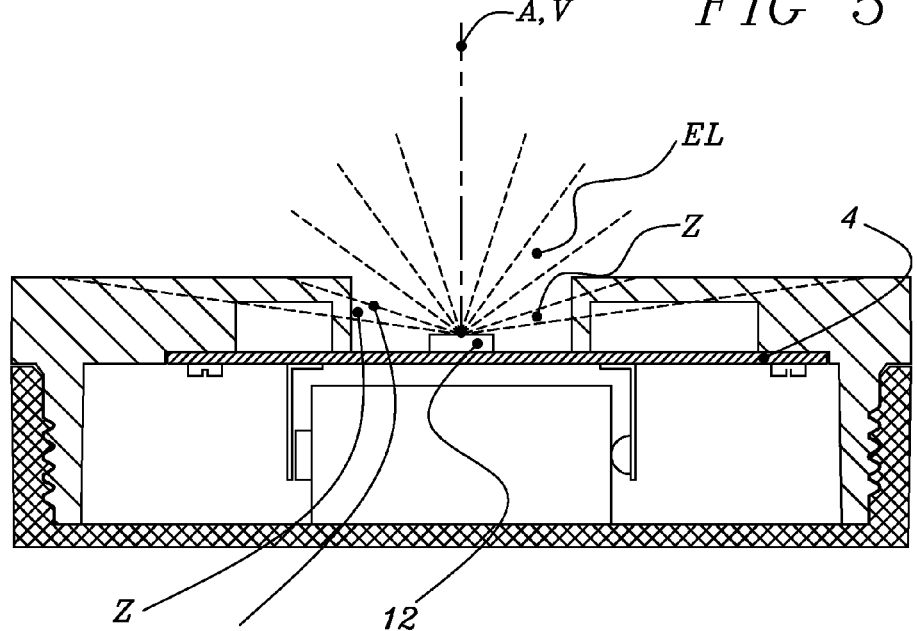
FIG. 5 is a cross-sectional view of an LED lighting device without an optic in accordance with some embodiments.

FIG. 5 is a cross-sectional view of an LED lighting device without an optic in accordance with some embodiments. The LED lighting device includes LED 12 positioned with LED element 12E within housing 3 zone Z of emitted light EL intersects top 2 where emitting light EL is dissipated and lost. This lost light does not contribute to the emitted light beam and reduces an overall efficiency of the LED lighting device. Optic 1 reduces this problem by first redirecting zone Z light of emitted light EL toward axis A out of housing 3 and subsequently directing emitted light EL away from axis A toward a horizontal plane.

Figure 6:
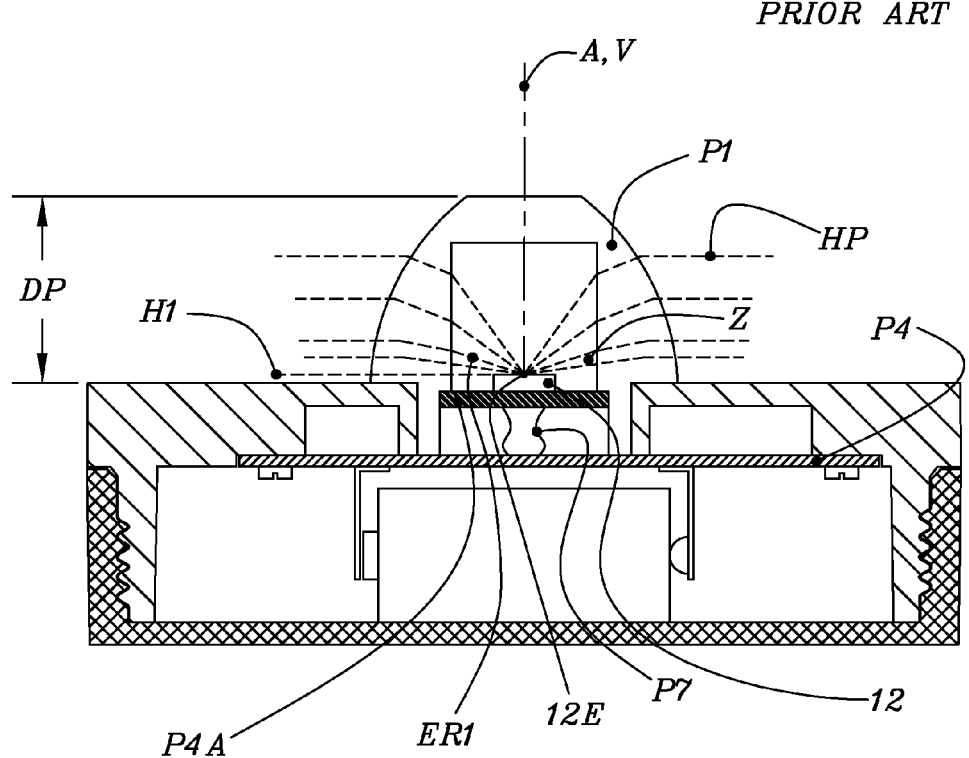
FIG. 6 is a cross-sectional view of a prior art LED lighting device including a separate printed circuit board (PCB).

FIG. 6 is a cross-sectional view of a prior art LED lighting device including a separate printed circuit board (PCB). However, in place of optic 1 and LED 12 soldered to PCB 4 of the LED light device of FIG. 5, the LED lighting device of FIG. 6 includes LED 12 soldered to interior lens printed circuit Board P4A mounted within prior art optic P1 which emits light along a plane horizontal plane H1 and LED element 12E of LED 12 are exterior to top 2. PCB P4 of FIG. 6 is similar to PCB 4 even though LED 12 is not included because both include battery 8 and other electronic components.

Interior lens printed circuit board P4A is electrically connected to PCB P4 using wires P7. This design collects zone Z of emitted light EL and directs the emitted light EL into horizontal plane HP; however, the LED light device of FIG. 6 has deficiencies. This design in including an additional PCB makes the lighting device more complex, expensive and prone to failure. In addition, prior art optic P1—a typical plano-convex cylindrical lens extends above top 2 by a prior art distance DP. The plano-convex lens uses increased height over optic 1 so that the plano-convex lens can collect light rays approaching from LED 12 at a variety of angles. The design of FIG. 6 includes lens height of prior art distance DP exceeding lens height distance D of FIG. 1 making the FIG. 6 design unacceptably large for many uses.

It is noteworthy to realize that optical Surfaces S1 through S6 may have contours different than those shown above but still employ the concepts of the present description. For example, surface S1 is shown as a curved profile which concentrates the impinging light. However, surface S1, in some embodiments, having a flat profile and still having optic 1 would achieve the objectives of the present description if surface S2 which receives the light from surface S1 had a profile change from a flat profile to a light concentrating curved profile such as a parabolic profile. Surface S4 is shown having a straight line contour such that surface S4 transmits the impinging substantially parallel rays of light which are perpendicular to surface S4 with minimal redirection of the light. The straight line contour is advantageous when the lighting device is placed in a snowstorm as vertical cylindrical surface S4 will deter snow from obscuring the light emitted from the lighting device. However, for some configurations of the present description refracting the light leaving surface S4 to adjust the beam spread is desirable. In some embodiments, changing the contour of surface S4 from the straight line contour shown to a curved or stepped contour is employed as a means to change the beam width and/or direction of the light emerging from optic 1.

Optic 1 is a transparent plastic with all of the optical surfaces formed during a single molding operation. This integral design reduces the cost and size of optic 1. The molding operation also improves the efficiency by reducing the number of surfaces and distance through which the light must pass. The molding operation further improves the efficiency by avoiding mismatches which could occur if the optical surfaces of optic 1 were assembled from discrete optical components.

In some embodiments, the light emerging from optic 1 is distributed throughout 360° however, one of ordinary skill in the art would recognize that adjusting the contour of optic 1 such that the emerging light is directional having a horizontal beam width less than 360 degrees is possible.

It will be readily seen by one of ordinary skill in the art that the disclosed embodiments fulfill one or more of the advantages set forth above. After reading the foregoing specification, one of ordinary skill in the art will be able to affect various changes, substitutions of equivalents and various other embodiments as broadly disclosed herein. It is therefore intended that the protection granted herein be limited only by the definition contained in the appended claims and equivalents thereof.

What is claimed is:

1. A lighting device comprising:
    a light emitting diode (LED) element configured to emit light about an axis;
    an optic of a transparent material, the optic comprising:
    a first surface configured to intersect and refract said emitted light to form a first light interior to said optic,
    a second surface configured to intersect and reflect said first light to form a second light interior to said optic,
    a third surface configured to intersect and reflect said second light to form a third light interior to said optic,
    a fourth surface configured to intersect and transmit said third light to form a fourth light exterior to said optic, the fourth surface further configured to concentrate the fourth light about an emerging light plane perpendicular to said axis.

2. The lighting device according to claim 1, further comprising:
    a housing of around the LED element, wherein said emerging light plane is exterior to said housing and an emitting light plane coincident with said LED element is substantially parallel to said emerging light plane.

3. The lighting device according to claim 1, further comprising:
    a housing, wherein the housing and said optic are part of a single molded body.

4. The lighting device according to claim 1, wherein the first surface, the second surface, the third surface and a fourth surface of said optic are part of a single molded body.

5. The lighting device according to claim 1, further comprising:
    a cover is attached to said optic forming a hermetically sealed compartment.

6. The lighting device according to claim 1, further comprising:
    a printed circuit board, and
    said LED element is a component of a ceramic LED lamp attached to said printed circuit board within a housing of said lighting device.

7. The lighting device according to claim 1, wherein said fourth surface comprises a substantially straight line contour, and
    said third light comprises substantially parallel rays of light substantially perpendicular to said fourth surface.

8. A lighting device comprising:
    a light emitting diode (LED) light source configured to emit light about an axis; and
    an optic, the optic comprising:
    a first surface configured to intersect and refract a first portion of said emitted light to form a first light interior to said optic,
    a second surface configured to intersect and reflect said first light to form a second light interior to said optic,
    a third surface configured to intersect and reflect said second light to form a third light interior to said optic,
    a fourth surface configured to intersect and transmit said third light to form a fourth light exterior to said optic, said fourth light concentrated about a plane perpendicular to said axis and exterior to said optic,
    a fifth surface configured to intersect and refract a second portion of said emitted light to form a fifth light interior to said optic, wherein said third surface is configured to intersect and reflect said fifth light to form a sixth light interior to said optic, and said fourth surface is configured to intersect and transmit said sixth light to form a seventh light exterior to said optic and concentrated about a plane perpendicular to said axis.

9. The lighting device according to claim 8, further comprising a housing around the LED element, wherein said emerging light plane is exterior to said housing and an emitting light plane coincident with said LED element is substantially parallel to said emerging light plane.

10. The lighting device according to claim 8, further comprising
    a housing, wherein said housing and said optic are part of a single molded body.

11. The lighting device according to claim 8 wherein:
    the first surface, the second surface, the third surface, the fourth surface and the fifth surface of said optic are part of a single molded body.

12. The lighting device according to claim 8, further comprising
    a cover attached to said optic forming a hermetically sealed compartment.

13. The lighting device according to claim 8, further comprising
    a printed circuit board, wherein
    said LED element is a component of a ceramic LED lamp attached to said printed circuit board within a housing of said lighting device.

14. The lighting device according to claim 8, wherein
    said fourth surface comprises a substantially straight line contour, and
    said third light comprises substantially parallel rays of light substantially perpendicular to said fourth surface.

15. A lighting device comprising:
    a housing having a light emitting diode (LED) light source and an optic, wherein said LED light source comprises an LED element disposed on an emitting light plane within said housing, said LED element is configured to emit light about an axis perpendicular to said emitting light plane, said optic is exterior to said housing, wherein said optic comprises:
    a first surface configured to intersect and refract said emitted light to form a first light interior to said optic,
    a second surface configured to intersect and reflect said first light to form a second light interior to said optic,
    a third surface configured to intersect and reflect said second light to form a third light interior to said optic,
    a fourth surface configured to intersect and transmit said third light to form a fourth light exterior to said optic, said fourth light concentrated about an emerging light plane perpendicular to said axis and exterior to said housing.

16. The lighting device according to claim 15, wherein said housing of said lighting device and said optic are part of a single molded body.

17. The lighting device according to claim 15, wherein the first surface, the second surface, the third surface and the fourth surface of said optic are part of a single molded body.

18. The lighting device according to claim 15, further comprising
a cover attached to said optic forming a hermetically sealed compartment.

19. The lighting device according to claim 15, further comprising
a printed circuit board, wherein
said LED element is a component of a ceramic LED lamp attached to said printed circuit board within said housing of said lighting device.

20. The lighting device according to claim 15, wherein
said fourth surface comprises a substantially straight line contour, and
said third light comprises substantially parallel rays of light substantially perpendicular to said fourth surface.

* * * * *